June 14, 1960   R. B. BALFOUR   2,940,463
HYDRAULIC REGULATOR
Filed June 13, 1956
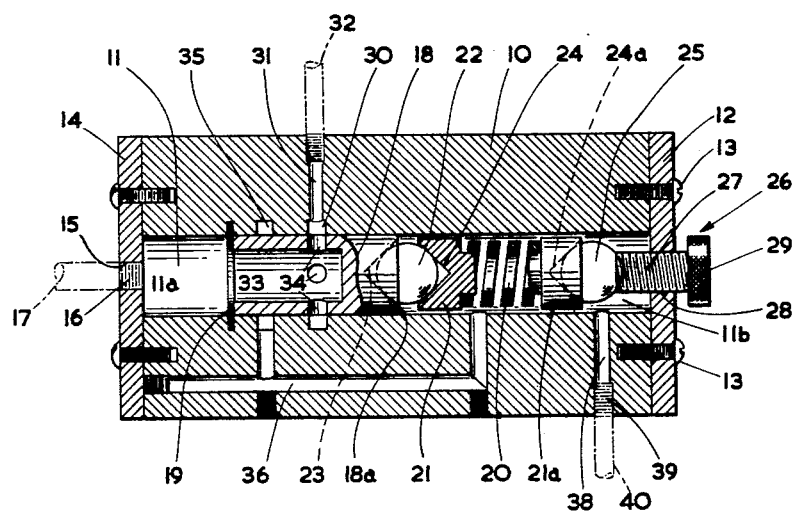
INVENTOR
RONALD BALFOUR
BY: Maybee & Legris
ATTORNEYS United States Patent Office 2,940,463
Patented June 14, 1960

2,940,463

HYDRAULIC REGULATOR

Ronald Bernard Balfour, Willowdale, Ontario, Canada, assignor to Orenda Engines Limited, Malton, Ontario, Canada, a corporation Filed June 13, 1956, Ser. No. 591,147

1 Claim. (Cl. 137—116.5)

This invention relates to a pressure regulating valve for fluid lines.

In fluid systems which operate under pressure it is often necessary to provide means whereby the pressure can be regulated so that it will, at no time, exceed a given maximum. Many valve structures have been designed to accomplish this purpose but these valves do not take into account the possibility of an excess pressure building up in the line downstream from the regulator valve due to unusual circumstances in the system.

It is an object of the present invention to provide a pressure regulating valve which will not only control the pressure in the line due to fluctuating pressures above the maximum in the supply system but will also compensate for pressure build ups in the line downstream from the regulator valve.

According to the present invention such a pressure regulator valve comprises a body portion having an axial bore closed at one end and defining, at the other, a fluid outlet, a piston slidable in the bore and dividing the bore into a pressure chamber and a sump chamber. A first internal circumferential groove is formed in the bore communicating with a fluid inlet, and a stop for the piston is provided on the wall of the bore downstream from the fluid inlet groove. Spring means are provided to urge the piston against the stop and a passage is provided through the piston which communicates, when the piston abuts the stop, with the circumferential groove at one end and with the pressure chamber at the other, and a second circumferential groove is provided lying between the stop and the first groove and communicating with the sump chamber.

The objects and features of the invention will become apparent when the following specification is read in the light of the appended drawing in which like reference numerals denote like parts and in which:

The drawing is an axial cross section of one embodiment of the pressure regulating valve.

Referring now to the drawing, it may be seen that the pressure regulating valve comprises a body 10 having an axial bore 11 which is closed at one end by an end plate 12 secured to the body by means of bolts 13. The other end of bore 11 is fitted with an end plate 14 having an aperture 15 therein which defines a fluid outlet port. The aperture 15 may conveniently be provided with internal threads 16 to enable a fluid line 17 to be coupled thereto.

Lying within the bore 11 of the body 10 is a piston 18 which divides the bore into a pressure chamber 11a and a sump chamber 11b. The piston 18 is biased in the direction of the fluid outlet port into abutment with stop means 19 on the wall of the bore 11. The stop means may conveniently take the form of a split ring seated in a groove cut in the wall of the bore.

The biasing means comprises, in the illustrated embodiment, a compression spring 20, seated at each end on a bearing plate 21 and 21a. Between bearing plate 21 and the end 18a of piston 18 is a ball 22 which rests in a conical depression 23 in face 18a of piston 18 and a second conical depression 24 in bearing plate 21. A similar conical depression 24a in bearing plate 21a holds a ball 25 seated therein and abutting, at its opposite side, the end of an adjusting screw 26. The adjusting screw 26 is formed with screw threads 27 on its shank and passes through a threaded hole 28 in end plate 12. It is fitted with a knurled knob 29 on its external end to enable it to be easily turned by hand. Thus, advancing or retracting the adjusting screw 26 by rotating knob 29 will vary the compressional force of spring 20 and hence the force with which piston 18 is urged against stop 19. It should be noted that this arrangement of spring, bearing plates and balls ensures that only an axial force will be exerted on the piston regardless of the compression of the spring.

On the external wall of bore 11 is cut a circumferential groove 30 which communicates by at least one drilling 31 with a high pressure fluid inlet conduit 32 leading from a source of pressurized fluid. The piston 18 is provided with a central axial bore 33 from which extend, in a radial direction, a plurality of spaced drillings 34. These drillings 34 register and communicate with grooves 30 when the piston is in abutment with stop 19 so that fluid may flow from the line 32, into pressure chamber 11a through drillings 31, groove 30, drillings 34 and bore 33 of piston 18.

A second groove 35 is cut circumferentially in the wall of bore 11 downstream from groove 30, between the stop 19 and groove 30, the distance between the stop 19 and the adjacent edge of the groove 35 being slightly greater than the diameter of drilling 34. This groove 35 leads to passage 36 which is vented to the sump chamber 11b. From the sump chamber there is provided a drain outlet 38 which may conveniently be provided with internal threads 37 to enable a fluid line 40 to be connected thereto.

In practice, the pressure regulating valve above described operates in the following manner. The valve is coupled to the fluid system with conduit 17 leading to the service which is to be supplied with fluid and line 32 leading from a source of high pressure fluid. Line 40 leads from the sump chamber 11b to a fluid storage or supply tank. Let it be assumed, also, that the service may receive fluid at a pressure of up to 100 p.s.i. maximum and that the high pressure source deliveres fluid at this pressure but is subject to surges of up to 120 p.s.i. Accordingly, the knob 29 of the adjusting screw 26 will be set so that the spring 20 exerts a force on piston 18 equal to 100 p.s.i. less the force required to overcome the static friction between the piston and the wall of the bore 11.

As the fluid from the line 32 is fed to the service through line 17 by means of drillings 31, groove 30, drilling 34, bore 33 and pressure chamber 11a, the piston 18 remains stationary provided the pressure in pressure chamber 11a does not rise above 100 p.s.i. If it should rise above this level, piston 18 will be moved away from stop 19 against the action of spring 20 and drillings 34 will move out of register with groove 30 to a greater or lesser extent depending upon how far in excess of 100 p.s.i. is the pressure in chamber 11a. If it is sufficiently in excess of the 100 p.s.i. level the piston 18 will move until drilling 34 is completely out of register with groove 30 and the flow of fluid to chamber 11a will cease.

If the flow through conduit 17 is sufficiently rapid, the pressure in chamber 11a may fall almost immediately to below the 100 p.s.i. maximum whereupon the piston will return under the action of spring 20 to enable drillings 34 to register once more with groove 30 to admit fluid again to pressure chamber 11a.

If, however, the flow of fluid through line 17 is restricted and the pressure in chamber 11a does not fall immediately, the piston 18 will be moved further against spring 20, uncovering groove 35 to spill fluid into the groove which delivers it to the sump chamber 11b from whence it is returned to the storage or supply tank through line 14.

The action just described will take place also, if for any reason, there is a backup of pressure in line 17 and groove 35 will act as a relief port to return the fluid to the supply tank of the system.

Thus, with varying pressures in line 32 and varying conditions in line 17, a constant hunting action takes place in piston 18 to maintain the pressure in chamber 11 at a constant predetermined value which may be set by the adjusting screw 26 and spring 20.

What I claim is:

A pressure regulator for liquid in pressurized conduit lines comprising a body having a cylindrical axial bore closed at one end and defining, at the other, a fluid outlet, a slidable piston within the bore dividing the bore into a pressure chamber between the piston and the fluid outlet and a sump chamber between the piston and the closed end of the bore, the piston having an axial bore closed at one end and communicating at the other with the pressure chamber, a radial hole from the bore of the piston to its external surface, a first, internal circumferential groove in the bore of the body communicating with a fluid inlet port, stop means in the bore downstream from the first groove to position the piston with the radial hole in communication with the first groove, means in the sump chamber to urge the piston towards the stop means, a second circumferential groove on the internal surface of the bore of the body and lying between the first groove and the stop means, the distance between the stop means and the adjacent edge of the second groove being greater than the diameter of the radial hole in the piston, the body having formed therein within its wall a passage extending between the second groove and the sump chamber and a drain port leading from the sump chamber.

References Cited in the file of this patent

UNITED STATES PATENTS

| | | | |
|---|---|---|---|
| 521,315 | Hoffman | June 12, | 1894 |
| 868,219 | Pietzuch | Oct. 15, | 1907 |
| 1,725,539 | Riley | Aug. 20, | 1929 |
| 1,903,338 | Horne | Apr. 4, | 1933 |
| 2,103,299 | Ravnsbeck | Dec. 28, | 1937 |
| 2,188,463 | Mercier | Jan. 30, | 1940 |
| 2,290,080 | Wahlmark | July 14, | 1942 |
| 2,421,133 | Towler et al. | May 27, | 1947 |
| 2,447,067 | Hamilton | Aug. 17, | 1948 |
| 2,518,852 | Annin | Aug. 15, | 1950 |
| 2,750,952 | Best | Jan. 19, | 1956 |

FOREIGN PATENTS

| | | | |
|---|---|---|---|
| 236,266 | Germany | Jan. 23, | 1910 |